United States Patent
Deng et al.

(10) Patent No.: US 12,203,866 B2
(45) Date of Patent: Jan. 21, 2025

(54) OPTICAL SENSING DEVICE AND OPTICAL SENSING METHOD THEREOF

(71) Applicant: EMINENT ELECTRONIC TECHNOLOGY CORP. LTD., Hsin-Chu (TW)

(72) Inventors: Zhong-Hao Deng, New Taipei (TW); Chan-Peng Lo, Taichung (TW); Shang-Ming Hung, Zhubei (TW); Pao-Shun Huang, Taoyuan (TW); Kao-Pin Wu, New Taipei (TW)

(73) Assignee: EMINENT ELECTRONIC TECHNOLOGY CORP. LTD., Hsin-Chu (TW)

( * ) Notice: Subject to any disclaimer, the term of this patent is extended or adjusted under 35 U.S.C. 154(b) by 247 days.

(21) Appl. No.: 17/979,730

(22) Filed: Nov. 2, 2022

(65) Prior Publication Data
US 2023/0236130 A1 Jul. 27, 2023

Related U.S. Application Data

(60) Provisional application No. 63/303,953, filed on Jan. 27, 2022.

(30) Foreign Application Priority Data

Jul. 26, 2022 (TW) .................................. 111127909

(51) Int. Cl.
  *G01N 21/88* (2006.01)
  *G01N 21/25* (2006.01)
  *G01N 21/93* (2006.01)

(52) U.S. Cl.
  CPC ............. *G01N 21/88* (2013.01); *G01N 21/25* (2013.01); *G01N 21/93* (2013.01)

(58) Field of Classification Search
  CPC ........ G01J 2005/607; G01J 5/026; G01J 5/60; G01J 5/602; G01J 5/0803;
  (Continued)

(56) References Cited

U.S. PATENT DOCUMENTS 4,547,074 A   10/1985   Hinoda et al.
2006/0215162 A1   9/2006   Shannon et al.
(Continued)

FOREIGN PATENT DOCUMENTS

TW   202104857 A   2/2021

OTHER PUBLICATIONS

Examination Report with Search Report dated Sep. 28, 2023 issued in corresponding Taiwan Application No. 111127909.

*Primary Examiner* — Peter B Kim
(74) *Attorney, Agent, or Firm* — MUNCY, GEISSLER, OLDS & LOWE, P.C.

(57) ABSTRACT

An optical sensing device includes a first sensor, a second sensor, a third sensor and a fourth sensor for sensing light to generate a first sensing signal, a second sensing signal, a third sensing signal and a fourth sensing signal, respectively. A spectrum of a coating of the first sensor includes a first peak of a X spectrum. A spectrum of a coating of the second sensor includes a second peak of the X spectrum. A spectrum of a coating of the third sensor includes a Y spectrum. A spectrum of a coating of the fourth sensor includes a Z spectrum. The first sensing signal and the second sensing signal are used to determine a X output value. The third sensing signal and the fourth sensing signal are used to determine a Y output value and a Z output value, respectively.

12 Claims, 8 Drawing Sheets

(58) Field of Classification Search
CPC ........... G01N 2021/8427; G01N 21/25; G01N 21/88; G01N 21/93
See application file for complete search history.

(56) References Cited

U.S. PATENT DOCUMENTS

2008/0179497 A1* 7/2008 Maniam .................... G01J 1/18
250/214 AL
2020/0149967 A1 5/2020 Siess

* cited by examiner

OPTICAL SENSING DEVICE AND OPTICAL SENSING METHOD THEREOF

This application claims priority of Application No. 111127909 filed in Taiwan on 26 Jul. 2022 under 35 U.S.C. § 119; and this application claims priority of U.S. Provisional Application No. 63/303,953 filed on 27 Jan. 2022 under 35 U.S.C. § 119(e); the entire contents of all of which are hereby incorporated by reference.

BACKGROUND OF THE INVENTION

Field of the Invention

The present invention relates to an optical sensing device, particularly to an optical sensing device and an optical sensing method for sensing correlated color temperature.

Description of the Prior Art

In comparison with the RGB color space established by CIE (Commission Internationale de L'Eclairage), the XYZ color space established by CIE can calculate correlated color temperature (CCT) more accurately. FIG. 1 shows a X spectrum 10, a Y spectrum 12 and a Z spectrum 14 in the CIE XYZ color space. FIG. 2 shows a traditional optical sensing device 20, which is used to sense light and generate a color temperature value. The optical sensing device 20 comprises three sensors 22, 24, 26, and a processing circuit (not shown). The sensor 22 includes a coating 222 and a photodiode 224, wherein the spectrum of the coating 222 includes the X spectrum 10. The sensor 24 includes a coating 242 and a photodiode 244, wherein the spectrum of the coating 242 includes the Y spectrum 12. The sensor 26 includes a coating 262 and a photodiode 264, wherein the spectrum of the coating 262 includes the Z spectrum 14. The processing circuit determines the color temperature value according to the sensing signals output by the sensors 22, 24 and 26.

As shown in FIG. 1, the X spectrum 10 of the coating 222 includes a first peak (a lower peak on the left side) 101 and a second peak (a higher peak on the right side) 102. However, the coating 222 having the lower peak and the higher peak is difficult to formulate and hard to fabricate. Further, it needs to use expensive materials, such as titanium dioxide ($TiO_2$) or silicon dioxide ($SiO_2$). Furthermore, a spectrum weight distortion, a mismatched peak, or a defective peak may appear in the X spectrum of the coating 222, as shown in FIG. 3. Besides, the ratio of the heights of the right peak and the left peak may deviate from the ideal ratio of 1.06:0.35. "Spectrum weight distortion" means that sensitivity appears in an area where sensitivity should not appear. "Mismatched peak" means that a peak appears in an area where a peak should not appear. "Defective peak" means that a peak appears in a correct position but the waveform thereof is problematic, such as a distorted waveform or a too wide/too narrow waveform. The processing circuit of the optical sensing device 20 can only perform linear compensation but cannot perform compensation for a single peak of the two peaks. Therefore, the processing circuit cannot perform compensation for the abovementioned problems. Once an error appears in the X spectrum of the coating 222, the error will directly affect the sensing result of the optical sensing device 20. Because it is hard to acquire an ideal X spectrum, the optical sensing device 20 suffers low yield and high cost.

SUMMARY OF THE INVENTION

One objective of the present invention is to provide an optical sensing device having higher yield in fabrication and an optical sensing method thereof.

The present invention proposes an optical sensing device, which comprises a first sensor, a second sensor, a third sensor, a fourth sensor, and a processing circuit. The first sensor includes a first coating, and the spectrum of the first coating includes a first peak of an X spectrum. The first sensor is used to sense light to generate a first sensing signal. The second sensor includes a second coating, and the spectrum of the second coating includes a second peak of the X spectrum. The second sensor is used to sense the light to generate a second sensing signal. The third sensor includes a third coating, and the spectrum of the third coating includes a Y spectrum. The third sensor is used to sense light to generate a third sensing signal. The fourth sensor includes a fourth coating, and the spectrum of the fourth coating includes a Z spectrum. The fourth sensor is used to sense light to generate a fourth sensing signal. The processing circuit is electrically coupled to the first sensor, the second sensor, the third sensor and the fourth sensor. The processing circuit generates an X output value according to the first sensing signal and the second sensing signal. The processing circuit generates a Y output value and a Z output value respectively according to the third sensing signal and the fourth sensing signal.

The present invention also proposes an optical sensing method, which comprises the steps of: sensing light by a first sensor to generate a first sensing signal, wherein the first sensor includes a first coating, and the spectrum of the first coating includes a first peak of an X spectrum; sensing light by a second sensor to generate a second sensing signal, wherein the second sensor includes a second coating, and the spectrum of the second coating includes a second peak of the X spectrum; sensing light by a third sensor to generate a third sensing signal, wherein the third sensor includes a third coating, and the spectrum of the third coating includes a Y spectrum; sensing light by a fourth sensor to generate a fourth sensing signal, wherein the fourth sensor includes a fourth coating, and the spectrum of the fourth coating includes a Z spectrum; generating an X output value according to the first sensing signal and the second sensing signal; and generating a Y output value and a Z output value respectively according to the third sensing signal and the fourth sensing signal.

The coatings of the optical sensing device of the present invention can be easily fabricated with less expensive materials. Further, the spectrum of each of the first sensor and the second sensor has only a single peak. Even though the spectrum of the first coating or the second coating is problematic, the present invention can solve the problem via using the processing circuit to perform linear compensation. Therefore, the present invention has higher yield in fabrication.

DETAILED DESCRIPTION OF THE INVENTION

Figure 1:
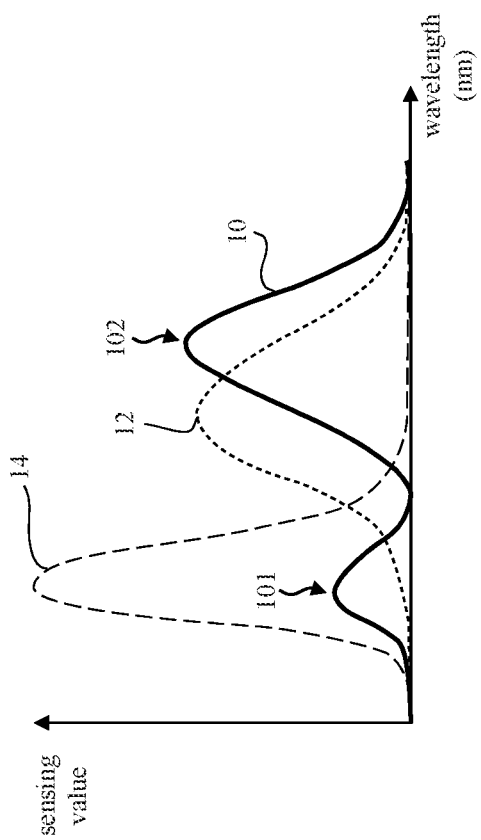
FIG. 1 shows an X spectrum, a Y spectrum and a Z spectrum in the CIE XYZ color space.
Figure 2:
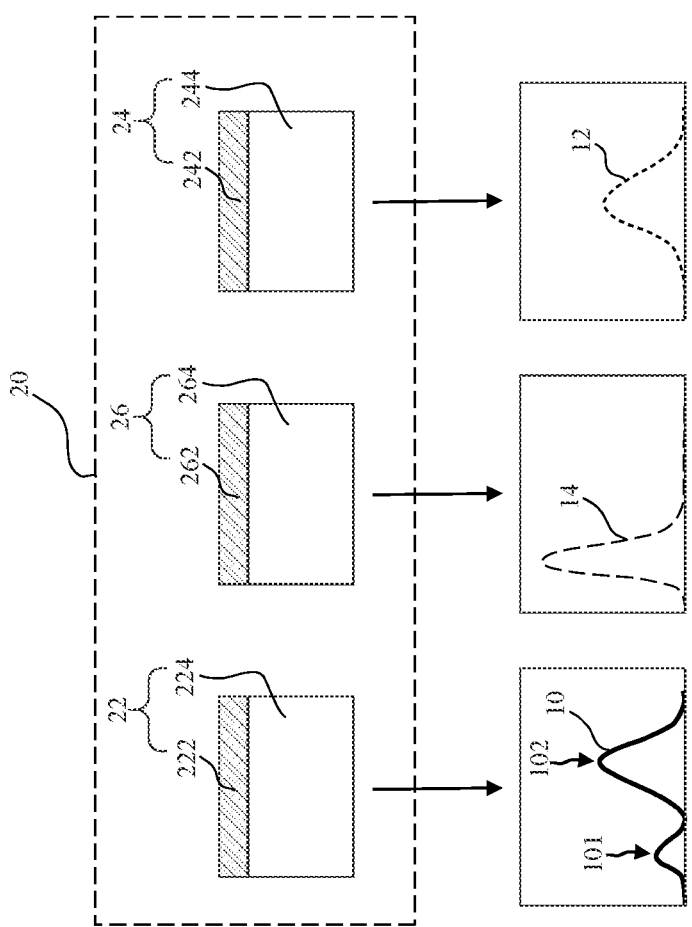
FIG. 2 schematically shows a traditional optical sensing device.
Figure 3:
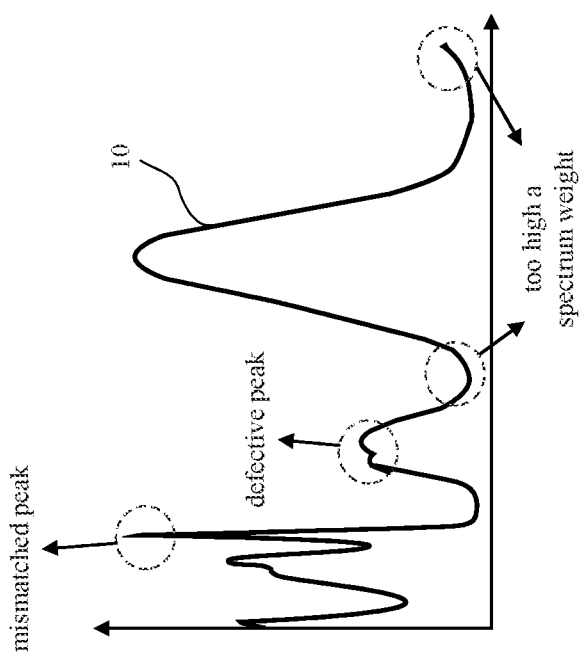
FIG. 3 shows an X spectrum of a traditional coating.
Figure 4:
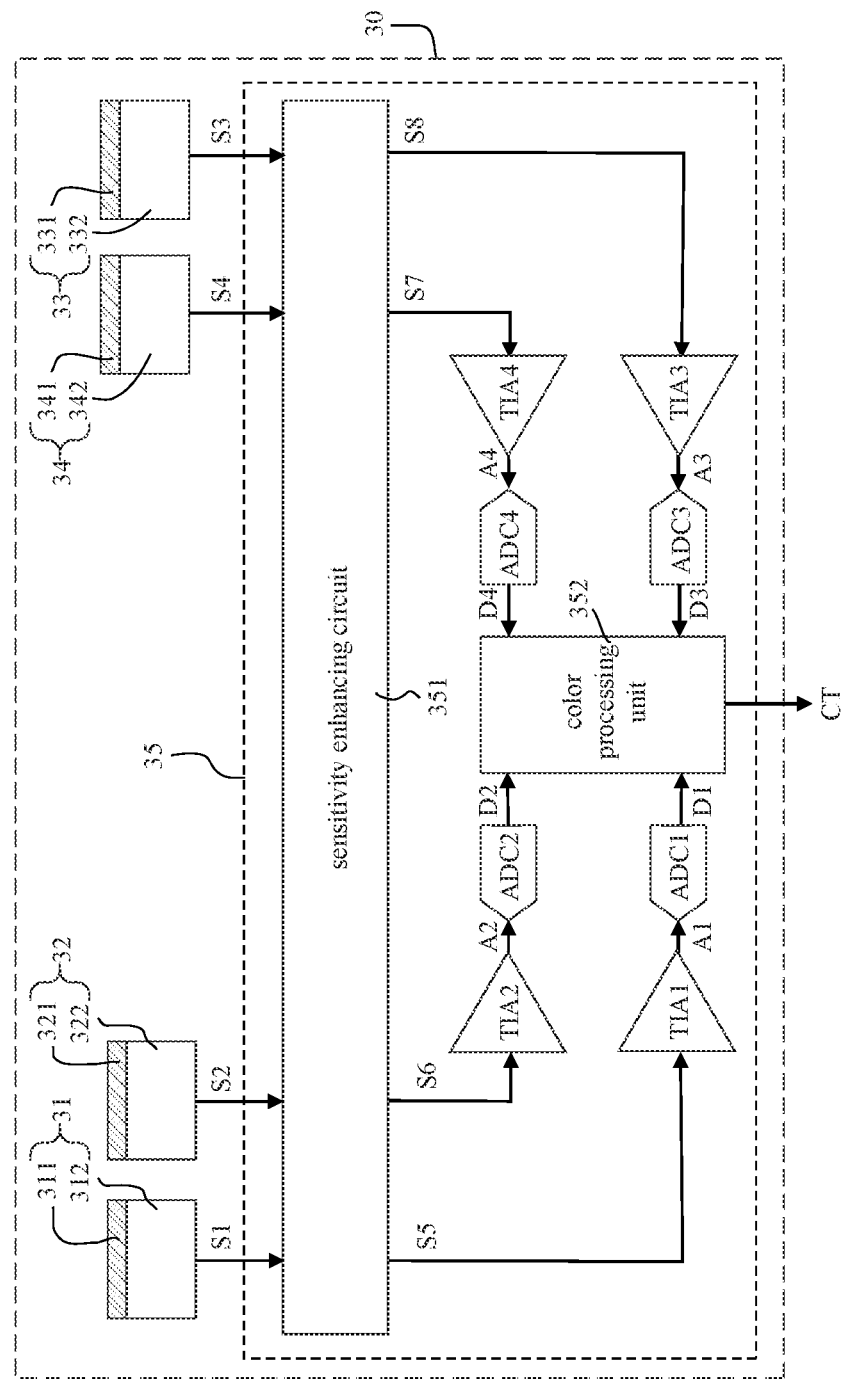
FIG. 4 schematically shows an optical sensing device according to one embodiment of the present invention.

FIG. 4 shows an optical sensing device 30 according to one embodiment of the present invention. The optical sensing device 30 comprises a first sensor 31, a second sensor 32, a third sensor 33, a fourth sensor 34, and a processing circuit 35. The first sensor 31 senses light to generate a first sensing signal S1. The first sensor 31 includes a first coating 311 and a photodiode 312, wherein the spectrum of the first coating 311 includes a first peak (a lower peak) 101 of an X spectrum 10. The second sensor 32 senses light to generate a second sensing signal S2. The second sensor 32 includes a second coating 321 and a photodiode 322, wherein the spectrum of the second coating 322 includes a second peak (a higher peak) 102 of the X spectrum 10. The third sensor 33 senses light to generate a third sensing signal S3. The third sensor 33 includes a third coating 331 and photodiode 332, wherein the spectrum of the third coating 331 includes a Y spectrum 12. The fourth sensor 34 senses light to generate a fourth sensing signal S4. The fourth sensor 34 includes a fourth coating 341 and a photodiode 342, wherein the spectrum of the fourth coating 341 includes a Z spectrum 14. The processing circuit 35 determines a color temperature value CT according to the first sensing signal S1, the second sensing signal S2, the third sensing signal S3 and the fourth sensing signal S4. A terminal device (not shown) coupled to the optical sensing device 30, such as a platform on the client side, can determine correlated color temperature according to the color temperature value CT.

Figure 5:
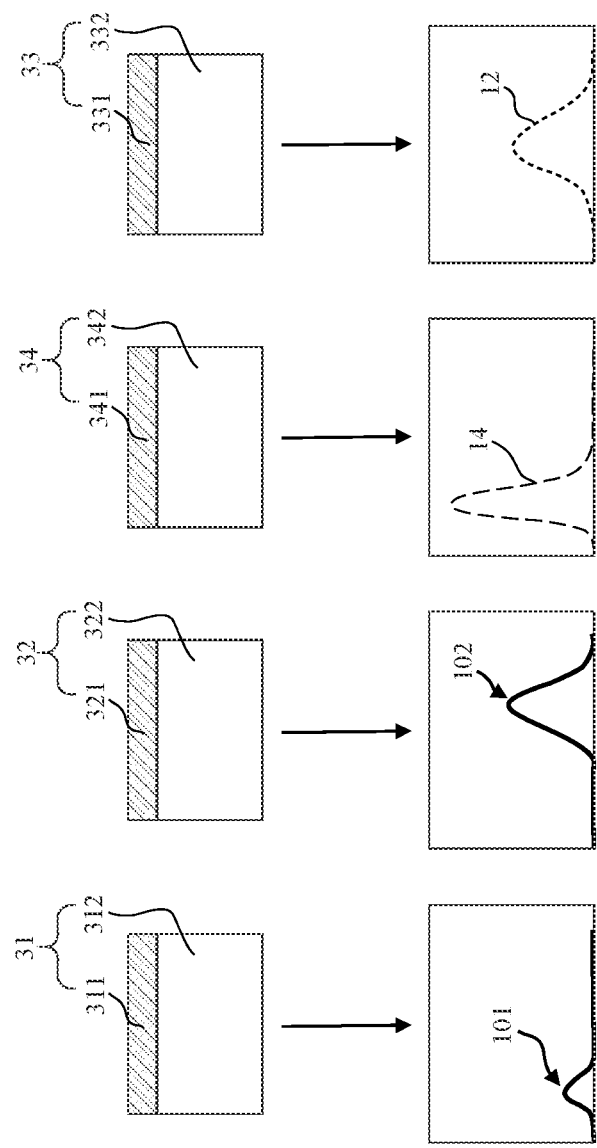
FIG. 5 shows the spectra of the first coating, the second coating, the third coating and the fourth coating shown in FIG. 4.

As shown in FIG. 5, each of the spectra of the first sensor 31, the second sensor 32, the third sensor 33 and the fourth sensor 34 has only a peak. Therefore, the first coating 311, the second coating 321, the third coating 331 and the fourth coating 341 can be fabricated easily with less expensive materials. In one embodiment, the material of the first coating 311, the second coating 321, the third coating 331 and the fourth coating 341 may be but is not limited to be silver. If the spectrum of the first coating 311, the second coating 321, the third coating 331 or the fourth coating 341 is defective, the present invention can solve the problem via using the processing circuit 35 to perform linear compensation. Therefore, the optical sensing device 30 of the present invention has higher yield in fabrication.

In the embodiment shown in FIG. 4, the processing circuit 35 includes a sensitivity enhancing circuit 351, a first transimpedance amplifier TIA1, a second transimpedance amplifier TIA2, a third transimpedance amplifier TIA3, a fourth transimpedance amplifier TIA4, a first analog-to-digital converter ADC1, a second analog-to-digital converter ADC2, a third analog-to-digital converter ADC3, a fourth analog-to-digital converter ADC4, and a color processing unit 352. The sensitivity enhancing circuit 351 is coupled to the first sensor 31, the second sensor 32, the third sensor 33 and the fourth sensor 34. The sensitivity enhancing circuit 351 compensates the first sensing signal S1, the second sensing signal S2, the third sensing signal S3 and the fourth sensing signal S4 to respectively generate a fifth sensing signal S5, a sixth sensing signal S6, a seventh sensing signal S7 and an eighth sensing signal S8. The first transimpedance amplifier TIA1 is coupled to the sensitivity enhancing circuit 351 to convert the fifth sensing signal S5 to a first voltage A1. The second transimpedance amplifier TIA2 is coupled to the sensitivity enhancing circuit 351 to convert the sixth sensing signal S6 to a second voltage A2. The third transimpedance amplifier TIA3 is coupled to the sensitivity enhancing circuit 351 to convert the seventh sensing signal S7 to a third voltage A3. The fourth transimpedance amplifier TIA4 is coupled to the sensitivity enhancing circuit 351 to convert the eighth sensing signal S8 to a fourth voltage A4. The first analog-to-digital converter ADC1 is coupled to the first transimpedance amplifier TIA1 to convert the first voltage A1 to a first digital signal D1. The second analog-to-digital converter ADC2 is coupled to the second transimpedance amplifier TIA2 to convert the second voltage A2 into a second digital signal D2. The third analog-to-digital converter ADC3 is coupled to the third transimpedance amplifier TIA3 to convert the third voltage A3 to a third digital signal D3. The fourth analog-to-digital converter ADC4 is coupled to the fourth transimpedance amplifier TIA4 to convert the fourth voltage A4 to a fourth digital signal D4. The color processing unit 352 is coupled to the first analog-to-digital converter ADC1, the second analog-to-digital converter ADC2, the third analog-to-digital converter ADC3 and the fourth analog-to-digital converter ADC4. The color processing unit 352 determines the color temperature value CT according to the first digital signal D1, the second digital signal D2, the third digital signal D3 and the fourth digital signal D4.

Because the optical sensing device 30 of the present invention needs four sensors 31, 32, 33 and 34, the optical sensing device 30 uses the sensitivity enhancing circuit 351 to compensate the sensitivity. In details, the sensitivity enhancing circuit 351 multiplies 4/3 with each of the first sensing signal S1, the second sensing signal S2, the third sensing signal S3 and the fourth sensing signal S4 of the first sensor 31, the second sensor 32, the third sensor 33 and the fourth sensor 34 to respectively generate the fifth sensing signal S5, the sixth sensing signal S6, the seventh sensing signal S7 and the eighth sensing signal S8.

Figure 6:
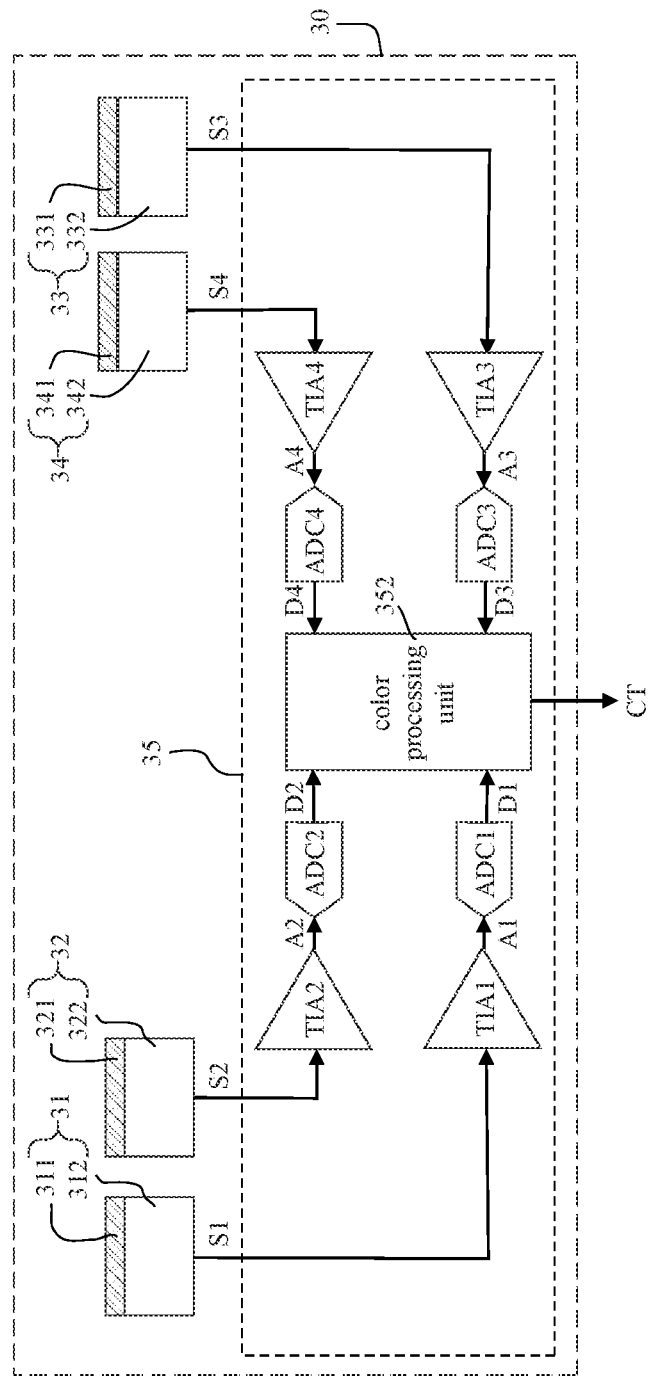
FIG. 6 schematically shows a second embodiment of the processing circuit of the present invention.

In another embodiment, the sensitivity enhancing circuit 351 may be integrated with the first transimpedance amplifier TIA1, the second transimpedance amplifier TIA2, the third transimpedance amplifier TIA3, and the fourth transimpedance amplifier TIA4. FIG. 6 schematically shows a second embodiment of the processing circuit 35. In FIG. 6, the processing circuit 35 includes a first transimpedance amplifier TIA1, a second transimpedance amplifier TIA2, a third transimpedance amplifier TIA3, a fourth transimpedance amplifier TIA4, a first analog-to-digital converter ADC1, a second analog-to-digital converter ADC2, a third analog-to-digital converter ADC3, a fourth analog-to-digital converter ADC4, and a color processing unit 352. The first transimpedance amplifier TIA1 is coupled to the first sensor 31. The first transimpedance amplifier TIA1 amplifies and converts the first sensing signal S1 to a first voltage A1 according to a compensation gain G1 (not shown). The second transimpedance amplifier TIA2 is coupled to the second sensor 32. The second transimpedance amplifier TIA2 is coupled to the second sensor 32 amplifies and converts the second sensing signal S2 to a second voltage A2 according to a compensation gain G2 (not shown). The third transimpedance amplifier TIA3 is coupled to the third sensor 33. The third transimpedance amplifier TIA3 amplifies and converts the third sensing signal S3 to a third voltage A3 according to a compensation gain G3 (not shown). The fourth transimpedance amplifier TIA4 is coupled to the fourth sensor 34. The fourth transimpedance amplifier TIA4 amplifies and converts the fourth sensing signal S4 to a fourth voltage A4 according to a compensation gain G4 (not shown). The first analog-to-digital converter ADC1 is coupled to the first transimpedance amplifier TIA1 to convert the first voltage A1 to a first digital signal D1. The second analog-to-digital converter ADC2 is coupled to the second transimpedance amplifier TIA2 to convert the second voltage A2 to a second digital signal D2. The third analog-to-digital converter ADC3 is coupled to the third transimpedance amplifier TIA3 to convert the third voltage A3 to a third digital signal D3. The fourth analog-to-digital converter ADC4 is coupled to the fourth transimpedance amplifier TIA4 to convert the fourth voltage A4 to a fourth digital signal D4. The color processing unit 352 is coupled to the first analog-to-digital converter ADC1, the second analog-to-digital converter ADC2, the third analog-to-digital converter ADC3, and the fourth analog-to-digital converter ADC4. The color processing unit 352 determines the color temperature value CT according to the first digital signal D1, the second digital signal D2, the third digital signal D3 and the fourth digital signal D4. In this embodiment, the compensation gains G1, G2, G3 and G4 are used to compensate for the sensitivity. In one embodiment, each of the compensation gains G1, G2, G3 and G4 may be 4/3. Thus, for a fixed total number of the sensors (such as a 6×6 sensor array), the present invention can also achieve the sensitivity level of the traditional optical sensing device 20.

In the abovementioned embodiments, the first sensing signal to the eighth sensing signal are current signals. The transimpedance amplifier amplifies the received current signal and converts the amplified current signal to a voltage signal.

Figure 7:
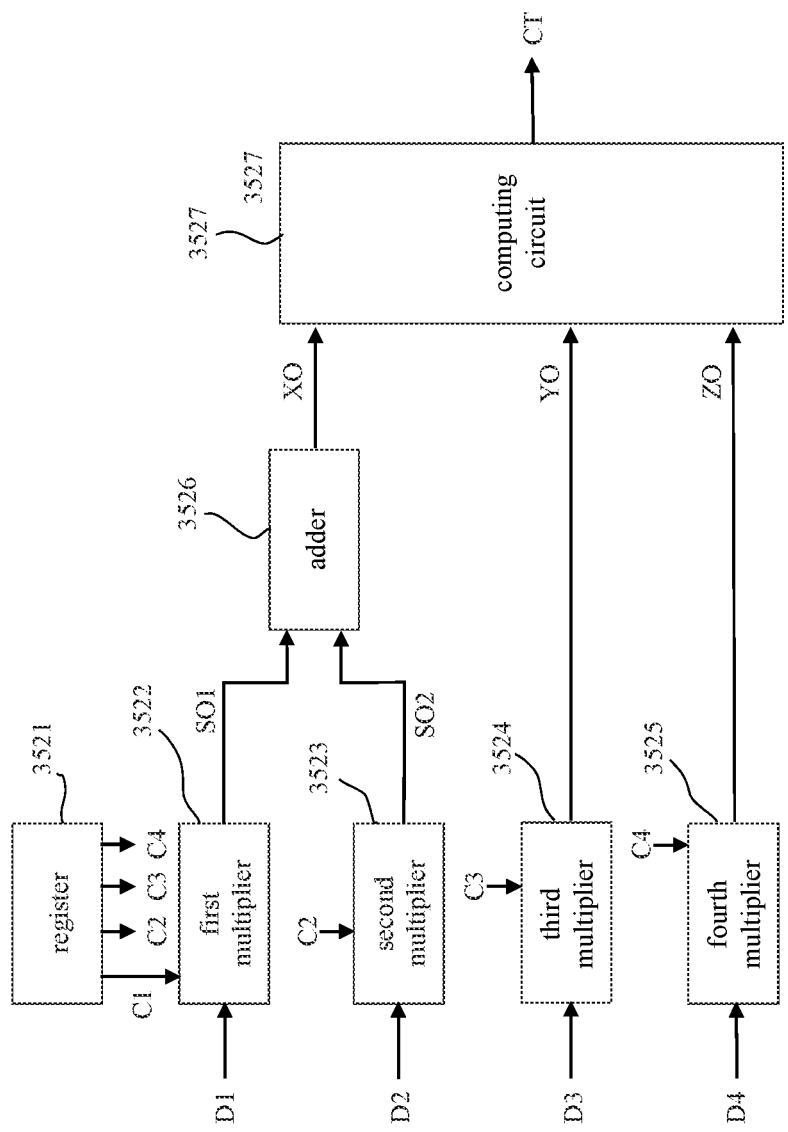
FIG. 7 schematically shows an embodiment of the color processing unit in FIG. 4 and FIG. 6.

FIG. 7 schematically shows an embodiment of the color processing unit 352 in FIG. 4 and FIG. 6. The color processing unit 352 includes a register 3521, a first multiplier 3522, a second multiplier 3523, a third multiplier 3424, a fourth multiplier 3525, an adder 3526, and a computing circuit 3527. The register 3521 is used to store and provide a first calibration coefficient C1, a second calibration coefficient C2, a third calibration coefficient C3 and a fourth calibration coefficient C4. The first multiplier 3522 is coupled to the register 3521 and the first analog-to-digital converter ADC1. The first multiplier 3522 is configured to multiply the first digital signal D1 with the first calibration coefficient C1 to generate a first sub-output value SQ1 The second multiplier 3523 is coupled to the register 3521 and the second analog-to-digital converter ADC2. The second multiplier 3523 is configured to multiply the second digital signal D2 with the second calibration coefficient C2 to generate a second sub-output value SQ2. The adder 3526 is coupled to the first multiplier 3522 and the second multiplier 3523. The adder 3526 is configured to generate an X output value XO by adding the first sub-output value SQ1 to the second sub-output value SQ2. The third multiplier 3524 is coupled to the register 3521 and the third analog-to-digital converter ADC3. The third multiplier 3524 is configured to multiply the third digital signal D3 with the third calibration coefficient C3 to generate a Y output value YO. The fourth multiplier 3525 is coupled to the register 3521 and the fourth analog-to-digital converter ADC4. The fourth multiplier 3525 is configured to multiply the fourth digital signal D4 with the fourth calibration coefficient C4 to generate a Z output value ZO. The computing circuit 3527 is coupled to the third multiplier 3524, the fourth multiplier 3525 and the adder 3526. The computing circuit 3527 generates a color temperature value CT according to the X output value XO, the Y output value YO and the Z output value ZO.

Figure 8:
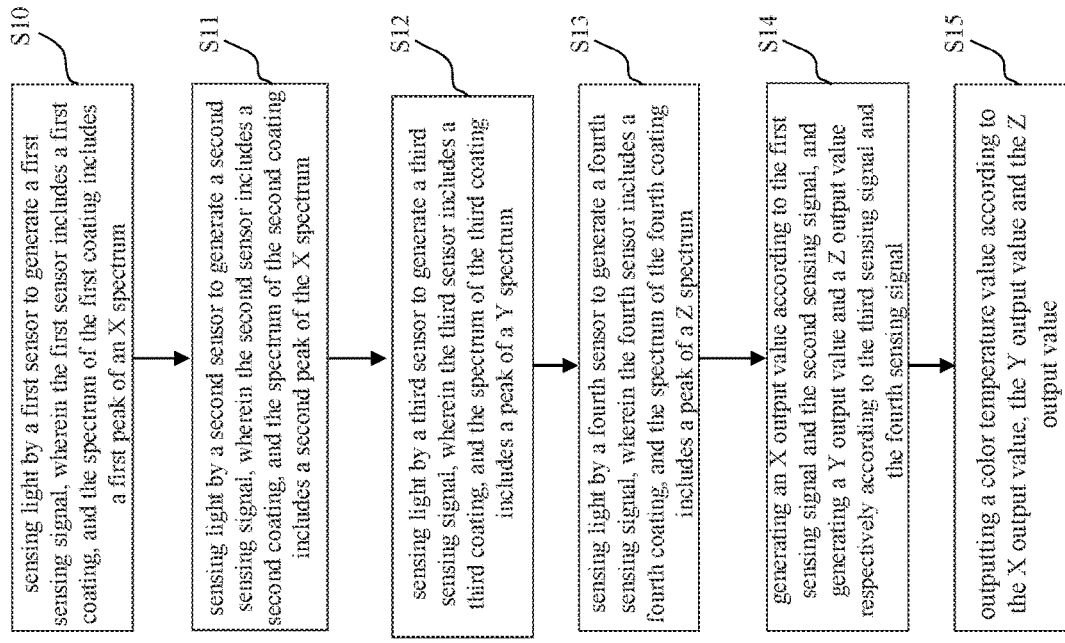
FIG. 8 shows a flowchart of an optical sensing method according to one embodiment of the present invention.

Based on the above description, it should be able to appreciate the optical sensing method of the present invention. The optical sensing method of the present invention may be illustrated by FIG. 8 and comprises the steps of:

Step S10: sensing light by a first sensor to generate a first sensing signal, wherein the first sensor includes a first coating, and the spectrum of the first coating includes a first peak of an X spectrum;

Step S11: sensing light by a second sensor to generate a second sensing signal, wherein the second sensor includes a second coating, and the spectrum of the second coating includes a second peak of the X spectrum;

Step S12: sensing light by a third sensor to generate a third sensing signal, wherein the third sensor includes a third coating, and the spectrum of the third coating includes a Y spectrum;

Step S13: sensing light by a fourth sensor to generate a fourth sensing signal, wherein the fourth sensor includes a fourth coating, and the spectrum of the fourth coating includes a Z spectrum;

Step S14: generating an X output value according to the first sensing signal and the second sensing signal, and generating a Y output value and a Z output value respectively according to the third sensing signal and the fourth sensing signal; and Step S15: outputting a color temperature value according to the X output value, the Y output value and the Z output value.

The embodiments described above are only to exemplify the present invention but not to limit the scope of the present invention. Through making some modification or variation according to the technical contents disclosed in the specification and claims, any person having ordinary knowledge of the art should be able to generate equivalent embodiments without departing from the present invention. Further, the equivalent embodiments are to be included by the scope of the present invention.

What is claimed is:
1. An optical sensing device, comprising:
a first sensor, configured to sense light to generate a first sensing signal and including a first coating, wherein a spectrum of the first coating includes a first peak of an X spectrum;
a second sensor, configured to sense the light to generate a second sensing signal and including a second coating, wherein a spectrum of the second coating includes a second peak of the X spectrum;
a third sensor, configured to sense light to generate a third sensing signal and including a third coating, wherein a spectrum of the third coating includes a Y spectrum;
a fourth sensor, configured to sense light to generate a fourth sensing signal and including a fourth coating, wherein a spectrum of the fourth coating includes a Z spectrum; and
a processing circuit, coupled to the first sensor, the second sensor, the third sensor, and the fourth sensor, generating an X output value according to the first sensing signal and the second sensing signal, and respectively generating a Y output value and a Z output value according to the third sensing signal and the fourth sensing signal;
wherein, the processing circuit comprises:

a sensitivity enhancing circuit, coupled to the first sensor, the second sensor, the third sensor, and the fourth sensor, configured to compensate the first sensing signal, the second sensing signal, the third sensing signal, and the fourth sensing signal to respectively generate a fifth sensing signal, a sixth sensing signal, a seventh sensing signal and, an eighth sensing signal;

a first transimpedance amplifier, coupled to the sensitivity enhancing circuit to convert the fifth sensing signal to a first voltage;

a second transimpedance amplifier, coupled to the sensitivity enhancing circuit to convert the sixth sensing signal to a second voltage;

a third transimpedance amplifier, coupled to the sensitivity enhancing circuit to convert the seventh sensing signal to a third voltage;

a fourth transimpedance amplifier, coupled to the sensitivity enhancing circuit to convert the eighth sensing signal to a fourth voltage;

a first analog-to-digital converter, coupled to the first transimpedance amplifier to convert the first voltage to a first digital signal;

a second analog-to-digital converter, coupled to the second transimpedance amplifier to convert the second voltage to a second digital signal;

a third analog-to-digital converter, coupled to the third transimpedance amplifier to convert the third voltage to a third digital signal;

a fourth analog-to-digital converter, coupled to the fourth transimpedance amplifier to convert the fourth voltage to a fourth digital signal; and a color processing unit, coupled to the first analog-to-digital converter, the second analog-to-digital converter, the third analog-to-digital converter, and the fourth analog-to-digital converter, configured to determine the X output value according to the first digital signal and the second digital signal, determine the Y output value according to the third digital signal, and determine the Z output value according to the fourth digital signal;

wherein, the color processing unit comprises:

a register, configured to provide a first calibration coefficient, a second calibration coefficient, a third calibration coefficient and a fourth calibration coefficient;

a first multiplier, coupled to the register and the first analog-to-digital converter, configured to multiply the first digital signal with the first calibration coefficient to generate a first sub-output value;

a second multiplier, coupled to the register and the second analog-to-digital converter, configured to multiply the second digital signal with the second calibration coefficient to generate a second sub-output value;

an adder, coupled to the first multiplier and the second multiplier, configured to generate the X output value by adding the first sub-output value to the second sub-output value;

a third multiplier, coupled to the register and the third analog-to-digital converter, configured to multiply the third digital signal with the third calibration coefficient to generate the Y output value; and a fourth multiplier, coupled to the register and the fourth analog-to-digital converter, configured to multiply the fourth digital signal with the fourth calibration coefficient to generate the Z output value.

2. The optical sensing device according to claim 1, wherein the processing circuit further generates a color temperature value according to the X output value, the Y output value, and the Z output value.

3. The optical sensing device according to claim 1, wherein each of the first sensor, the second sensor, the third sensor and the fourth sensor comprises a photodiode.

4. The optical sensing device according to claim 1, wherein material of each of the first coating, the second coating, the third coating and the fourth coating comprises silver.

5. An optical sensing device, comprising:

a first sensor, configured to sense light to generate a first sensing signal and including a first coating, wherein a spectrum of the first coating includes a first peak of an X spectrum;

a second sensor, configured to sense the light to generate a second sensing signal and including a second coating, wherein a spectrum of the second coating includes a second peak of the X spectrum;

a third sensor, configured to sense light to generate a third sensing signal and including a third coating, wherein a spectrum of the third coating includes a Y spectrum;

a fourth sensor, configured to sense light to generate a fourth sensing signal and including a fourth coating, wherein a spectrum of the fourth coating includes a Z spectrum; and a processing circuit, coupled to the first sensor, the second sensor, the third sensor, and the fourth sensor, generating an X output value according to the first sensing signal and the second sensing signal, and respectively generating a Y output value and a Z output value according to the third sensing signal and the fourth sensing signal;

wherein, the processing circuit comprises:

a first transimpedance amplifier, coupled to the first sensor, configured to amplify and convert the first sensing signal to a first voltage;

a second transimpedance amplifier, coupled to the second sensor, configured to amplify and convert the second sensing signal to a second voltage;

a third transimpedance amplifier, coupled to the third sensor, configured to amplify and convert the third sensing signal to a third voltage;

a fourth transimpedance amplifier, coupled to the fourth sensor, configured to amplify and convert the fourth sensing signal to a fourth voltage;

a first analog-to-digital converter, coupled to the first transimpedance amplifier to convert the first voltage to a first digital signal;

a second analog-to-digital converter, coupled to the second transimpedance amplifier to convert the second voltage to a second digital signal;

a third analog-to-digital converter, coupled to the third transimpedance amplifier to convert the third voltage to a third digital signal;

a fourth analog-to-digital converter, coupled to the fourth transimpedance amplifier to convert the fourth voltage to a fourth digital signal; and a color processing unit, coupled to the first analog-to-digital converter, the second analog-to-digital converter, the third analog-to-digital converter, and the fourth analog-to-digital converter, configured to determine the X output value according to the first digital signal and the second digital signal, determine the Y output value according to the third digital signal, and determine the Z output value according to the fourth digital signal;

wherein, the color processing unit comprises:

a register, configured to provide a first calibration coefficient, a second calibration coefficient, a third calibration coefficient and a fourth calibration coefficient;

a first multiplier, coupled to the register and the first analog-to-digital converter, configured to multiply the first digital signal with the first calibration coefficient to generate a first sub-output value;

a second multiplier, coupled to the register and the second analog-to-digital converter, configured to multiply the second digital signal with the second calibration coefficient to generate a second sub-output value;

an adder, coupled to the first multiplier and the second multiplier, configured to generate the X output value by adding the first sub-output value to the second sub-output value;

a third multiplier, coupled to the register and the third analog-to-digital converter, configured to multiply the third digital signal with the third calibration coefficient to generate the Y output value; and a fourth multiplier, coupled to the register and the fourth analog-to-digital converter, configured to multiply the fourth digital signal with the fourth calibration coefficient to generate the Z output value.

6. The optical sensing device according to claim 5, wherein the processing circuit further generates a color temperature value according to the X output value, the Y output value, and the Z output value.

7. The optical sensing device according to claim 5, wherein each of the first sensor, the second sensor, the third sensor and the fourth sensor comprises a photodiode.

8. The optical sensing device according to claim 5, wherein material of each of the first coating, the second coating, the third coating and the fourth coating comprises silver.

9. An optical sensing method, comprising the steps of:
sensing light by a first sensor to generate a first sensing signal, wherein the first sensor includes a first coating, and a spectrum of the first coating includes a first peak of an X spectrum;

sensing the light by a second sensor to generate a second sensing signal, wherein the second sensor includes a second coating, and a spectrum of the second coating includes a second peak of the X spectrum;

sensing the light by a third sensor to generate a third sensing signal, wherein the third sensor includes a third coating, and a spectrum of the third coating includes a Y spectrum;

sensing the light by a fourth sensor to generate a fourth sensing signal, wherein the fourth sensor includes a fourth coating, and a spectrum of the fourth coating includes a Z spectrum; and generating an X output value according to the first sensing signal and the second sensing signal, and generating a Y output value and a Z output value respectively according to the third sensing signal and the fourth sensing signal;

wherein, the step of generating the X output value, the Y output value and the Z output value comprises the steps of:

compensating the first sensing signal, the second sensing signal, the third sensing signal and the fourth sensing signal to generate a fifth sensing signal, a sixth sensing signal, a seventh sensing signal and an eighth sensing signal, respectively;

converting the fifth sensing signal, the sixth sensing signal, the seventh sensing signal and the eighth sensing signal to a first voltage, a second voltage, a third voltage and a fourth voltage, respectively;

converting the first voltage, the second voltage, the third voltage and the fourth voltage to a first digital signal, a second digital signal, a third digital signal and a fourth digital signal. respectively;

determining the X output value according to the first digital signal and the second digital signal;

determining the Y output value according to the third digital signal; and determining the Z output value according to the fourth digital signal;

wherein, the step of determining the X output value, the Y output value and the Z output value comprise the steps of:

multiplying the first digital signal with a first calibration coefficient to generate a first sub-output value;

multiplying the second digital signal with a second calibration coefficient to generate a second sub-output value;

generating the X output value by adding the first sub-output value to the second sub-output value;

multiplying the third digital signal with a third calibration coefficient to generate the Y output value; and multiplying the fourth digital signal with a fourth calibration coefficient to generate the Z output value.

10. The optical sensing method according to claim 9, further comprising the step of outputting a color temperature value according to the X output value, the Y output value and the Z output value.

11. An optical sensing method, comprising the steps of:
sensing light by a first sensor to generate a first sensing signal, wherein the first sensor includes a first coating, and a spectrum of the first coating includes a first peak of an X spectrum;

sensing the light by a second sensor to generate a second sensing signal, wherein the second sensor includes a second coating, and a spectrum of the second coating includes a second peak of the X spectrum;

sensing the light by a third sensor to generate a third sensing signal, wherein the third sensor includes a third coating, and a spectrum of the third coating includes a Y spectrum;

sensing the light by a fourth sensor to generate a fourth sensing signal, wherein the fourth sensor includes a fourth coating, and a spectrum of the fourth coating includes a Z spectrum; and generating an X output value according to the first sensing signal and the second sensing signal, and generating a Y output value and a Z output value respectively according to the third sensing signal and the fourth sensing signal;

wherein the step of generating the X output value, the Y output value and the Z output value comprises the steps of:

amplifying and converting the first sensing signal, the second sensing signal, the third sensing signal and the fourth sensing signal to a first voltage, a second voltage, a third voltage and a fourth voltage, respectively;

converting the first voltage, the second voltage, the third voltage and the fourth voltage to a first digital signal, a second digital signal, a third digital signal and a fourth digital signal, respectively;

determining the X output value according to the first digital signal and the second digital signal;

determining the Y output value according to the third digital signal; and determining the Z output value according to the fourth digital signal;

wherein the step of determining the X output value, the Y output value and the Z output value comprise the steps of:

multiplying the first digital signal with a first calibration coefficient to generate a first sub-output value;

multiplying the second digital signal with a second calibration coefficient to generate a second sub-output value;

generating the X output value by adding the first sub-output value to the second sub-output value;

multiplying the third digital signal with a third calibration coefficient to generate the Y output value; and multiplying the fourth digital signal with a fourth calibration coefficient to generate the Z output value.

12. The optical sensing method according to claim 11, further comprising the step of outputting a color temperature value according to the X output value, the Y output value and the Z output value.

* * * * *